Figure 3:
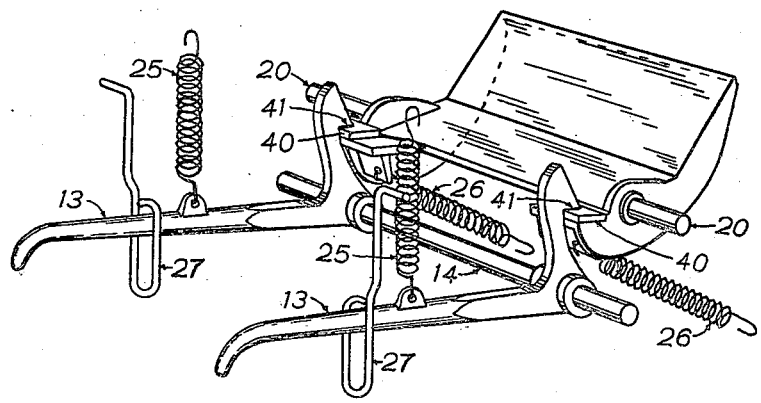

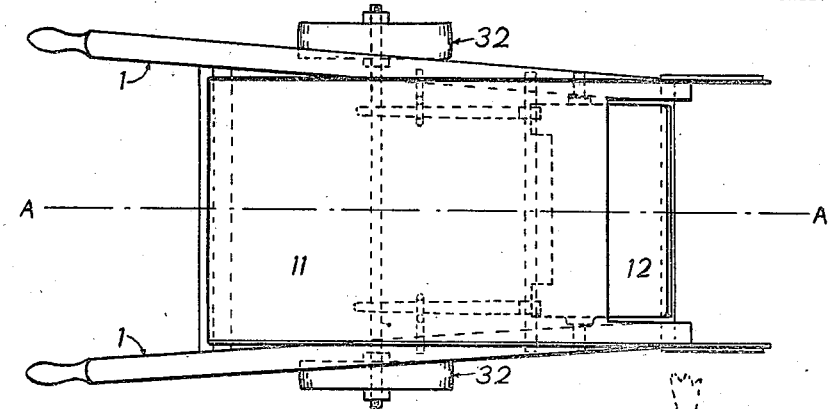
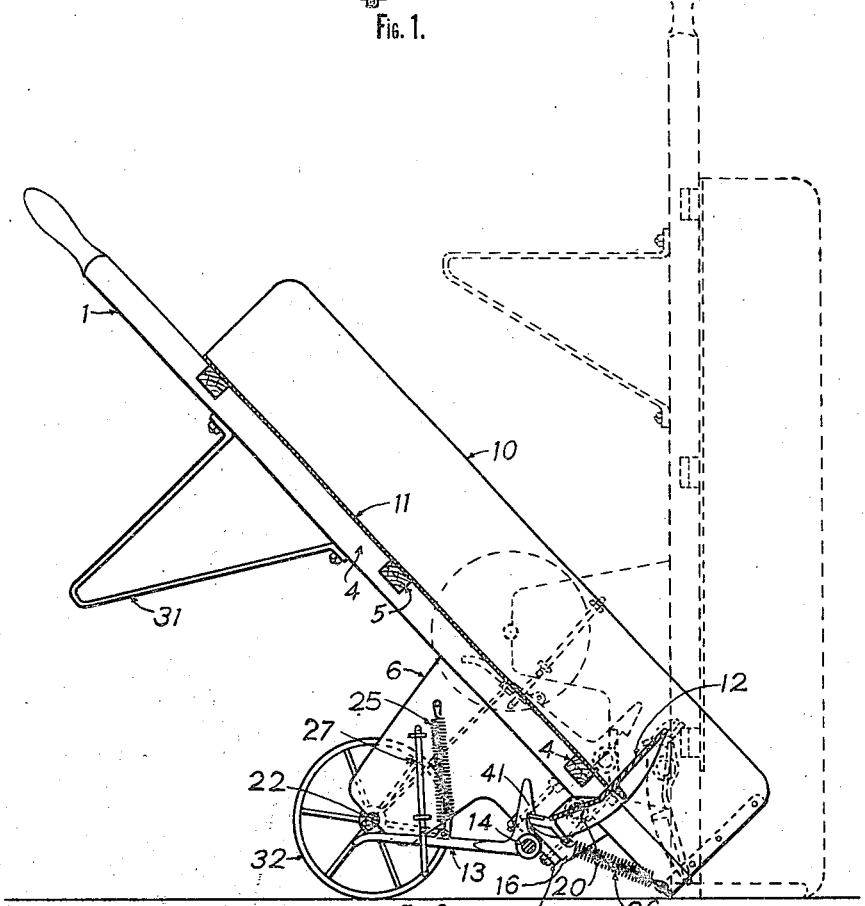

Patented Nov. 21, 1922.

1,436,173

UNITED STATES PATENT OFFICE.

CHARLES O. HOXIE, OF ROCHESTER, NEW YORK.

DUMPING TRUCK.

Application filed September 22, 1921. Serial No. 502,412.

*To all whom it may concern:*

Be it known that I, CHARLES O. HOXIE, a citizen of the United States, residing at 70 Lowell St., Rochester, in the county of Monroe and State of New York, have invented certain new and useful Improvements in Dumping Trucks, of which the following is a specification.

This invention relates to dumping trucks, and has for its object to provide a truck or wheel barrow with improved means for depositing the load in an orderly manner. It will be found particularly useful in carrying brick, cement blocks, small packages and any other material which is liable to be injured by indiscriminate dumping. By the present invention the load may be dropped from the truck without disturbing the orderly arrangement of the parts. Obviously it is also capable of use in connection with the transportation of any kind of material, to save some of the labor of unloading and to enable the material to be deposited at a particular place.

Altho shown in connection with a two-wheel truck, the invention may be applied to a one-wheel truck of the wheel barrow type, and no limitation in this respect is implied. In the present invention the load is held on the truck by a swinging gate at the front end thereof, and this gate will drop into position parallel with the floor of the truck in an opening at the front end thereof, so that the front end of the truck may be lodged against the floor and the load will drop directly and vertically from the truck, as will be more fully apparent from the following description.

In the accompanying drawings Fig. 1 is a plan of the truck. Fig. 2 is a section on the line A—A of Fig. 1. Fig. 3 is a perspective of the dumping gate and its connections removed from the truck.

Referring specifically to the drawings, 11 indicates the floor of the truck, 10 the side guides, 1 the handles, 31 the legs, and 4 the side sills forming continuations of the handles. The side sills are connected by cross sills 5 under the floor. This body is mounted on blocks 6, axle 22, and wheels 32. Instead of two wheels, one wheel may be used at the middle of the axle, for a wheel barrow type.

A swinging gate is indicated at 12, and this works in an opening in the floor of the truck at the front end thereof, between the sills 4, the gate being mounted on pivots 20 at the ends thereof which fit in bearings in the front extensions 16 of the blocks 6, so that the gate may be swung up in position between the sides 10, as shown in full lines in Fig. 2 or may be dropped down below the floor line when released, as shown in dotted lines in said figure.

The rear edge of the gate is provided at each end with a hardened plate extension 40 adapted to be engaged by hooks 41 at the ends of bent levers 13 which are mounted upon a cross shaft 14 carried in bearings 17 secured to the lower edge of the block extensions 16. The rear ends of these levers extend through the loops of guides 27 which are secured to the sides of the blocks 6, and these guides serve to limit the movement of the levers. Each lever is also provided with a spring 25 tending to hold the hooks in engagement with the gate. The gate is also provided with springs 26 at each end tending to lift the same to normal or upright position.

When the hooks are engaged as shown in full lines in Fig. 2 the gate will hold the load in the truck, for transportation. To dump the load, the front end of the truck is lowered to the floor, and then by pressing with his foot upon the rear end of either lever 13 the truckman can release the catches, permitting the weight of the load to drop the gate and dump the load. By tilting the truck to vertical position, as shown in dotted lines in Fig. 2, before releasing the gate, the load, such as the stack of bricks, can be dropped directly and vertically onto the floor, and so will not be disarranged or upset. When the truck is backed off from the load the springs 26 return the gate to original position, the edges of the plates 40 wiping across the beveled ends of the hooks until they clear the same when the springs 25 contact to reengage the hooks and hold the gate for the next load.

By setting the gate back from the front end of the truck, in an opening in the floor of the truck, it is possible to swing the truck to upright position for a straight vertical drop of the load, which would not be possible if the gate were at the extreme front end of the truck. The invention is not limited to the particular details shown, but the construction may be modified in various ways within the scope of the following claims.

I claim:

1. A dumping truck or the like provided with a hinged gate set in a recess in the front end of the floor of the truck, and latch means to hold and release said gate.

2. A dumping truck the floor of which has an opening at the front end thereof, and a swinging gate pivoted to the frame of the truck and working in said opening, and latch means to hold and release the gate.

3. A dumping truck the floor of which has an opening at the front end thereof, and a swinging gate pivoted to the frame of the truck and working in said opening, and means to hold and release the gate, said means including a spring catch engageable with the lower edge of the gate.

4. A dumping truck provided with a swinging gate at the end of the body thereof, and a spring latch carried under the floor of the truck and engageable with the lower edge of said gate when the latter is in raised position.

5. A dumping truck provided with a swinging gate at the front end thereof, a spring tending to raise said gate, and a latch engageable with the gate to hold the same in raised position.

6. A dumping truck provided with a swinging gate at the front end thereof, a spring tending to raise said gate, and a latch engageable with the gate to hold the same in raised position, said latch being pivoted to the frame of the truck under the floor thereof.

7. A dumping truck provided with a pivoted gate at the front thereof, said gate arranged to swing above or below the floor of the truck, and a foot lever pivoted to the truck frame under the floor thereof and having a hook at its end adapted to engage the lower edge of the gate and hold the same in raised position.

8. A dumping truck provided with a hinged gate at the end thereof, and arranged to swing above or below the floor of the truck, a shaft extending across the truck under the bottom thereof, catches carried by said shaft and engageable with the lower edge of the gate to hold the same in raised position, and means to turn the shaft to release the catches.

In testimony whereof, I affix my signature in presence of two witnesses.

CHARLES O. HOXIE.

Witnesses:
RAYMOND H. ARNOT,
ARTHUR B. NORRIS.